United States Patent [19]

Cain et al.

[11] 3,882,186
[45] May 6, 1975

[54] RETARDATION OF RUBBER VULCANIZATION

[75] Inventors: Maurice Edward Cain; Geoffrey Thomas Knight; Peter McHugh Lewis; Ian Richard Gelling, all of London, England

[73] Assignee: Natural Rubber Producers' Research Association, London, England

[22] Filed: Aug. 23, 1973

[21] Appl. No.: 390,740

[30] Foreign Application Priority Data
Aug. 23, 1972 United Kingdom............... 39354/72

[52] U.S. Cl...... 260/780; 260/45.9 QB; 260/45.9 R; 260/94.4; 260/96 R
[51] Int. Cl........................... C08c 11/40; C08d 1/38
[58] Field of Search................ 260/45.9, 94.4, 96 R; 252/401, 402, 403, 405

[56] References Cited
UNITED STATES PATENTS

| | | | |
|---|---|---|---|
| 2,170,191 | 8/1939 | Fisher | 260/806 |
| 3,032,520 | 5/1962 | Shaw | 260/45.9 R |
| 3,035,014 | 5/1962 | Popoff | 260/45.9 R |

*Primary Examiner*—V. P. Hoke
*Attorney, Agent, or Firm*—Wenderoth, Lind & Ponack

[57] ABSTRACT

Cyclo-2,5-diene derivatives particularly 4-imino-cyclohexa-2,5-dien-1 ones and cyclohexa-2,5-dien-1,4-di-imines are used as pre-vulcanization inhibitors for natural and unsaturated rubbers compounded with sulphur vulcanizing agents and thiazole vulcanization accelerators. It is claimed that the inhibitors do not reduce the rate of vulcanization and do not interfere with p-phenylenediamine antidegradants; also that their reaction products exert an antidegradant effect in the vulcanized rubber.

7 Claims, No Drawings

RETARDATION OF RUBBER VULCANIZATION

Many compounding ingredients, including chemical anti-ozonants of the substituted p-phenylenediamine type are detrimental to the scorch safety of rubber containing free sulphur, even in the presence of modern delayed action accelerators of the sulphenamide type, thus necessitating the use of vulcanization retarders. The latter traditionally include acidic materials which suffer from the drawbacks that they reduce the rate of vulcanization and interfere with the basic antidegradants.

Crosslink formation in a thiazole derivative accelerated sulphur vulcanizing system is accompanied by the production of 2-mercaptobenzothiazole (MBT) which acts as a catalyst for the vulcanization reaction. Recently a new class of retardeers, "pre-vulcanization inhibitors" (PVI), has been developed which improve the processing safety of rubber mixes compounded with a thiazole derivative as accelerator and sulphur, without affecting the rate of vulcanization. These compounds, alkylthioamines, react with MBT (R. I. Leib, A. B. Sullivan and C. D. Trivette Jr. Rubber Chem. and Tech., 1970, 1188.) and hence halt its catalytic action until all the PVI has been consumed, thus considerably improving the processing safety of the rubber mix (K. S. Baistany and A. B. Sullivan, Tetrahedron Letters, 1970, 3547.). The PVI/MBT reaction products do not however improve the antidegradant properties of the vulcanizates.

The object of the present invention is to provide improved scorch or pre-vulcanization resistance to mixes without excessively reducing the rate of vulcanization.

The invention accordingly provides a method of inhibiting the premature vulcanization of a rubber vulcanizable by heating with a sulphur vulcanizing agent and a thiazole vulcanization accelerator, which method comprises incorporating into the rubber, in addition to the sulphur vulcanizing agent and the thiazole vulcanization accelerator a cyclohexa-2,5-diene derivative having the formula

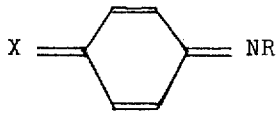

where
X is O or NR'
and R and R' may be the same or different and are inert groups.

In another aspect, the invention further provides a vulcanizable composition comprising a sulphur-vulcanizable rubber, a sulphur vulcanizing agent, a thiazole vulcanization accelerator, and, as a premature vulcanization inhibitor, a cyclohexa-2,5-diene as defined above.

The rubber may be a natural rubber or a synthetic diene rubber, i.e., any rubber having an unsaturated carbon chain.

The sulphur vulcanizing agent may be free elemental sulphur or may be partly or wholly derived from sulphur donors, and is generally used in an amount of 0.5 to 3.0 parts per 100 parts by weight of dry rubber (pphr).

Thiazole accelerators are well known in the rubber compounding field, where they are generally used in amounts of from 0.1 to 2.0 pphr. Conventional thiazole accelerators and their derivatives include.

N-cyclohexyl-2-benzothiazolesulphenamide
N-tert-butyl-2-benzothiazolesulphenamide
2-(morpholinothio) benzothiazole
benzothiazyl disulphide
2-mercapto-benzothiazole
2-benzothiazolyl diethyldithiocarbamate
N,N-di-isopropyl-2-benzothiazolesulphenamide
N,N-diethyl-2-benzothiazolesulphenamide
N,N-dicyclohexyl-2-benzothiazolesulphenamide
2-(2,6-dimethylmorpholinothio) benzothiazole.

The vulcanizable rubber mix may include other ingredients, whose natures and amounts are well known in the rubber compounding field. Thus, zinc, generally in the form of zinc oxide in an amount of from 2 to 25 pphr, and stearic acid or other fatty rubber-soluble acid in an amount of from 1 to 10 pphr, will usually be present as secondary activators. The rubber may be filled, e.g., with furnace or other carbon black, or unfilled. Other compounding ingredients, accelerators, antidegradants, processing aids, fillers and extenders may be present, in accordance with the knowledge in the art.

The cyclohexa-2,5-diene derivatives are generally used in amounts of from 0.1 to 10 pphr. Below 0.5 pphr the inhibiting effects are likely to be small. Increasing the amount of inhibitor above 5.0 pphr does not very much increase the inhibiting effect. In the formula above, when X is NR' (which is preferred), R and R' may be the same or different, and are both inert groups, e.g. hydrocarbon groups, such as alkyl or cycloalkyl groups preferably containing up to 10 carbon atoms, or aryl groups, preferably monocyclic aryl groups.

The cyclohexa-2,5-diene derivatives act in the same way as the alkyl thioamine pre-vulcanization inhibitors i.e. they react with MBT and hence stop vulcanization until all the cyclohexa-2,5-diene derivatives have been consumed. Thus these new pre-vulcanization inhibitors are only effective in a thiazole derivative accelerated system. In the absence of an accelerator the cyclohexa-2,5-diene derivatives are themselves accelerators, considerably increasing the rate of sulphur vulcanization (Fisher U.S. Pat. No. 2170191 (1934)).

An advantage of the present invention is that the major products from the cyclohexa-2,5-diene/MBT reaction are antidegradants thus improving the properties of the vulcanizates. The products obtained from a typical cyclohexa-2,5-diene derivative and MBT are shown in scheme I.

Scheme I.

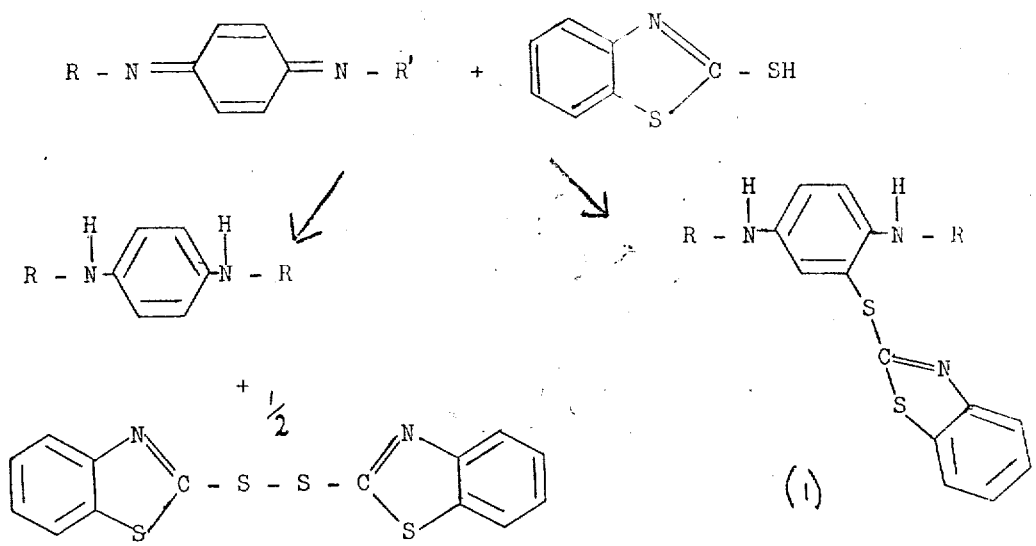

Rubbers compounded as described above can be processed, e.g., by calendering or extrusion or forming into a desired shape prior to vulcanization, with reduced risk of scorch. The invention also enables the processing safety of 'scorched' or 'partially scorched' rubber mixes, i.e., those whose cumulative heat history during processing has rendered them unsuitable for recycling or further processing, to be recovered so that they may be used safely.

The retarders may be used in the presence of substituted p-phenylenediamine antiozonants without loss of ozone resistance. Partial or total replacement of these antiozonants by the retarders further improves scorch safety while ozone resistance remains high.

The inclusion of these retarders to rubber mixes does not adversely affect the initial physical properties of the final vulcanizates.

The invention is illustrated, but not limited, by the following examples.

EXAMPLE I

The improvements in processing safety, as measured by the Mooney Scorch Test are shown in Table I. The vulcanizates being prepared according to the following formulations:

| Formulation | Ia | Ib | Ic | Id | Ie | If | Ig | Ih |
|---|---|---|---|---|---|---|---|---|
| Ribbed Smoked Sheet | 100 | 100 | 100 | 100 | 100 | 100 | 100 | 100 |
| Zinc oxide | 5 | 5 | 5 | 5 | 5 | 5 | 5 | 5 |
| Stearic acid | 2 | 2 | 2 | 2 | 2 | 2 | 2 | 2 |
| Process oil | 5 | 5 | 5 | 5 | 5 | 5 | 5 | 5 |
| HAF black | 45 | 45 | 45 | 45 | 45 | 45 | 45 | 45 |
| N-Cyclohexyl-2-benzo-thiazoylsulphenamide (CBS) | 0.5 | — | — | 0.5 | 1.8 | — | — | 0.5 |
| N-tert-butyl-2-benzo-thiazoylsulphenamide | — | 0.5 | — | — | — | — | — | — |
| 2-(Morpholinothio)benzothiazole | — | — | 0.5 | — | — | — | — | — |
| 2-Mercaptobenzothiazole | — | — | — | — | — | 0.5 | — | — |
| Benzothiazyl disulphide | — | — | — | — | — | — | 0.75 | — |
| Zinc diethyldithio-carbamate | — | — | — | 0.2 | — | — | — | — |
| Diphenyl guanidine | — | — | — | — | — | — | — | 0.2 |
| Sulphur | 2.5 | 2.5 | 2.5 | 2.5 | 1.2 | 2.0 | 2.0 | 2.5 |
| Additive | ←——————— Varies ———————→ | | | | | | | |

Table I

| Formulation | Additive | Conc" (pphr) | Minimum Viscosity | $t_5$ (min.) | $t_{34-5}$ (min.) |
|---|---|---|---|---|---|
| Ia | None | — | 26 | 20 | 4.5 |
| Ia | N-Nitrosodiphenylamine retarder + | 1 | — | 30.5 | 10 |
| Ia | N-Cyclohexylthiophthalmide + | 0.1 | 26.5 | 31.5 | 4.5 |
| Ia | N-Cyclohexylthiophthalmide + | 0.2 | 29 | 40 | 7.0 |
| Ia | N-Phenyl-4-iminocyclohexa-2,5-diene-1-one | 1.0 | 29 | 27.5 | 12.7 |
| Ia | N-(1,3-Dimethylbutyl)-4-iminocyclohexa-2,5-dien-1-one | 1.0 | 32 | 27 | 9.8 |
| Ia | N-Isopropyl-N'-phenylcyclohexa-2,5-diene-1,4-diimine | 2.5 | 13 | 36 | 6 |
| Ia | N-Cyclohexyl-N'-phenylcyclohexa-2,5-diene-1,4-diimine | 1.0 | 20 | 30.5 | 6 |
| Ia | " | 2.5 | 11 | 35.5 | 7.5 |
| Ia | " | 5.0 | 14 | 37 | 6.5 |
| Ia | N-(1-Methylheptyl)-N'-phenyl-cyclohexa-2,5-diene-1,4-diimine | 2.5 | 14 | 36 | 7.0 |
| Ia | N-(1,3-Dimethylbutyl)-N'-phenylcyclohexa-2,5-diene-1,4-diimine | 2.5 | 9 | 38 | 6.5 |
| Ia | N,N'-Diphenylcyclohexa-2,5-diene-1,4-diimine | 1.0 | 18 | 31 | 9 |
| Ia | N,N'-Di(1-ethyl-3-methylpentyl)cyclohexa-2,5-diene-1,4-diimine | 1.0 | 17 | 31 | 5 |
| Ia | N,N'-Di(1-ethyl-3-methylpentyl)cyclohexa-2,5-diene-1,4-diimine | 2.5 | 13 | 35.5 | 5.5 |
| Ia | " | 5.0 | 22 | 52 | — |

Table I −Continued

| Formulation | Additive | Mooney Scorch 120°C. Conc" (pphr) | Minimum Viscosity | $t_5$ (min.) | $t_{35-5}$ (min.) |
|---|---|---|---|---|---|
| Ia | N-Cyclohexyl-N'-phenylcyclohexa-2,5-diene-1,4-diimine | 1.5 } | 19 | 36.5 | 6.0 |
| Ia | N,N'-Di(1-ethyl-3-methylpentyl)cyclohexa-2,5-diene-1,4-diimine | 1.5 } | | | |
| Ib | None | — | 36 | 28.5 | 7 |
| Ib | N-Cyclohexyl-N'-phenylcyclohexa-2,5-diene-1,4-diimine | 2.0 | 19 | 39 | 10 |
| Ic | None | — | 37 | 25 | 11.5 |
| Ic | N-Cyclohexyl-N'-phenylcyclohexa-2,5-diene-1,4-diimine | 2.0 | 19 | 36.5 | 16 |
| Id | None | — | — | 14 | 1.0 |
| Id | N,N'-Di(1-ethyl-3-methylpentyl)cyclohexa-2,5-diene-1,4-diimine | 2.5 | — | 28 | 3 |
| Ie | None | — | 43 | 29.5 | 3 |
| Ie | N-(1,3-Dimethylbutyl)-N'-phenylcyclohexa-2,5-diene-1,4-diimine | 2.5 | 23 | 36 | 4 |
| If | None | — | 52 | 11 | 3 |
| If | N-Cyclohexyl-N'-phenylcyclohexa-2,5-diene-1,4-diimine | 0.5 | 37 | 13.5 | 5 |
| Ig | None | — | 31 | 15 | 3 |
| Ig | N-Cyclohexyl-N'-phenylcyclohexa-2,5-diene-1,4-diimine | 3.0 | 25 | 25 | 9 |
| Ih | None | — | 27 | 19 | 4 |
| Ih | N-Cyclohexyl-N'-phenylcyclohexa-2,5-diene-1,4-diimine | 3.0 | 20 | 38 | 6.5 |

+ Commercially available material.

EXAMPLE 2

Although the time $t_{35-5}$ obtained from the Mooney Scorch Test at 120°C is often taken as a measure of the rate of vulcanization, a better indication is given by the analysis of the curve obtained using a Monsanto Rheometer at the cure temperature. Rheometer curves obtained with some of the mixes used in Example I are analysed in Table 2 which shows that the rates of vulcanization are not substantially changed by the inclusion of the retarders.

EXAMPLE 3

The effect of mixtures of a p-phenylenediamine and the present compounds on the processing safety was investigated using the natural rubber formulation (Ia) of Example 1. The results of the Mooney Scorch Tests (Table 3) show that processing safety is improved in the presence of the p-phenylenediamine, whilst still retaining the antiozonant properties of the rubber vulcanizate.

TABLE 2

Analysis of Rheometer Traces

Formulation (Ia), Rheometer arc ± 1, range 50, temp. 140°C

| Additive | Level (pphr) | Minimum torque L | Scorch time L+2 (min.) | Intercept (a) of max slope on L (min.) | Torque rise above minimum M-L | Time (b) to L + 95% (M-L) (min.) | Cure rate (b-a) (min.) |
|---|---|---|---|---|---|---|---|
| None | — | 14 | 7 | 8 | 60.5 | 27.5 | 19.5 |
| N,N-Di(1 ethyl-3-methyl-pentyl 1) cyclo-hexa-2,5-diene-1,4-diimine | 5 | 8 | 11.5 | 19 | 63.6 | 36.5 | 19.5 |
| N-(1,3-Dimethylbutyl)-N-phenyl-cyclohexa-2,5-diene-1,4-diimine | 2 | 7 | 9 | 4 | 67.5 | 32 | 18 |

Table 3

| Additive | Conc" (pphr) | Mooney Scorch at 120°C Minimum viscosity | $t_5$ (min.) | $t_{(35-5)}$ min. | Antiozonant Properties (Critical Strain % 25 pphm of ozone at 30°C) |
|---|---|---|---|---|---|
| None | — | 28 | 22 | 4 | 3–5 |
| N,N'-Dicyclohexyl-p-phenylenediamine | 2 | 21 | 13.5 | 2 | 5–10 |
| N,N'-Dicyclohexyl-p-phenylenediamine | 4 | 21 | 11 | 2 | — |
| N,N'-Dicyclohexyl-p-phenylenediamine<br>N-Phenyl-4-iminocyclohexa-2,5-dien-1-one | 2 }<br>2 } | 19.5 | 21 | 5 | 10–15 |
| N,N-Dicyclohexyl-p-phenylenediamine<br>N,N'-Di(1-ethyl-3-methylpentyl)cyclohexa-2,5-diene-1,4-diimine | 2 }<br>2 } | 17 | 18.5 | 3 | 20 |
| N,N'-Di(1-ethyl-3-methylpentyl)cyclohexa-2,5-diene-1,4-diimine | 5 | 19 | 52 | — | >25 |
| N,N'-Dicyclohexyl-p-phenylenediamine<br>N-Phenyl-4-iminocyclohexa-2,5-dien-1-one | 4 }<br>2 } | 13.5 | 19.5 | 2.5 | 20 |
| N,N'-Dicyclohexyl-p-phenylenediamine<br>N-Diphenylcyclohexa-2,5-diene-1,4-diimine | 4 }<br>3 } | 15 | 19.5 | 3 | 20 |

EXAMPLE 4

The NR formulation (Ia) of Example I (Mooney Scorch, $t_s$ at 120°C, 22 min) was worked on the mill for 45 min. at 110°C. Various levels of two retarders were added to portions of the worked mix and the Mooney Scorch measured (Table 4). The processing safety is completely recovered by less than 2 pphr of the additives.

Table 4

Recovery of Scorched Stock

| Additive | Level pphr | Mooney Scorch at 120°C | |
|---|---|---|---|
| | | Minimum Viscosity | $T_s$ (min) |
| None | — | 15.5 | 5.5 |
| N,N-Diphenylcyclohexa-2,5-diene-1,4-diimine | 1 | 15 | 15.5 |
| " | 2.5 | 11.5 | 27 |
| " | 5.0 | 11.5 | 34 |
| N,-(1,3-dimethylbutyl)-N-phenylcyclohexa-2,5-diene-1,4-diimine | 1 | 12 | 18 |
| " | 2.5 | 9 | 31 |
| " | 5.0 | 12 | 37 |

EXAMPLE 5

The effect of the retarders on processing safety in cis-polyisoprene (Natsyn 400) as measured by the Mooney Scorch Test is shown in Table 7. The formulation employed was identical to that for natural rubber (Formulation Ia).

Table 5

Processing safety of polyisoprene mixes

| Compound | Level pphr | Mooney Scorch at 120°C | | |
|---|---|---|---|---|
| | | Minimum Viscosity | $t_s$(min) | $t_{35-s}$(min) |
| No Additive | | 47 | 22.5 | 6 |
| N-phenyl-4-iminocyclohexa-2,5-diene-1-one | (2.5) | 35 | 43 | 17 |
| N,N'-Diphenylcyclohexa-2,5-diene-1,4-diimine | (2.5) | 23.5 | 43 | 17 |
| N,N'-Di(1-ethyl-3-methylpentyl)cyclohexa-2,5-diene-1,4-diimine | (2.5) | 33 | 37 | 6 |
| N-(1,3-Dimethylbutyl)-N'-phenylcyclohexa-2,5-diene-1,4-diimine | (2.5) | 31 | 38 | 7 |

EXAMPLE 6

The processing safety of some cyclohexa 2,4-diene derivatives (Table 6) was examined in comparison with the corresponding p-aminophenol or p-phenylenediamine in the following Styrene-butadiene copolymer formulation.

| Formulation II | Parts by weight |
|---|---|
| Styrene-butadiene copolymer | 100 |
| Zinc oxide | 5 |
| Stearic acid | 2 |
| Process oil | 5 |
| HAF black | 50 |
| CBS | 1.5 |
| S | 1.5 |
| Additive | Varies |

TABLE 6

Improved processing safety on an SBR mix

| | Level pphr | Mooney Scorch at 130°C | | |
|---|---|---|---|---|
| | | Minimum Viscosity | $t_s$ min | $t_{(35-s)}$ min |
| None | — | 47 | 26 | 4 |
| N-Phenyl-4-aminophenol | 2 | 41 | 17 | 5.5 |
| N-Phenyl-4-iminocyclohexa-2,5-dien-1-one | 2.5 | 38.5 | 26 | 24 |
| N,N'-Diphenyl p-phenylenediamine | 2 | 41.5 | 23 | 5 |
| N,N'-Diphenylcyclohexa-2,5-diene-1,4-diimine | 2.5 | 40 | 26.5 | 11 |
| N-Isopropyl-N'-phenyl-p-phenylenediamine | 2 | 44 | 20 | 3.5 |
| N-Isopropyl-N'-phenylcyclohexa-2,5-diene-1,4-diimine | 2.5 | 42 | 22 | 6 |
| N,N'-Di(1-ethyl-3-methylpentyl)p-phenylenediamine | 2 | 42 | 15 | 3.5 |
| N,N'-Di(1-ethyl-3-methylpentyl) cyclohexa-2,5-diene-1,4-diimine | 2.5 | 44 | 26 | 3 |

EXAMPLE 7

Although conventional PVIs improve the processing safety of rubber mixes they do not affect the antidegradant properties of the vulcanizates. The reaction of these new PVIs with MBT during vulcanization produces good antidegradants. Tables 7 and 8 compare the antidegradant properties of vulcanizates (Formulation Ia) compounded with a conventional PVI, a cyclohexa-2,5-diene-1,4-diimine and the reaction product of a cyclohexa-2,5-diene-1,4-diimine and MBT (N-Cyclohexyl-N'-phenyl-3-(benzothiazole-2'-thiyl)-p-phenylenediamine (1; R=cyclohexyl; R'=phenyl).

Table 7

Air Oven Ageing Resistance at 100°C

| Additive | Conc$^n$ pphr | Tensile properties | | | | | | | | | | |
|---|---|---|---|---|---|---|---|---|---|---|---|---|
| | | Unaged | | | Aged 2 days | | | Aged 3 days | | | Aged 5 days | |
| | | TS | M100 | EB | TS | M100 | EB | TS | M100 | EB | TS | M100 | EB |
| None | — | 28.5 | 2.3 | 510 | 7.8 | 2.3 | 220 | 5.4 | 1.9 | 215 | 3.8 | 2.8 | 125 |
| Santogard PVI | 1.0 | 27.9 | 2.4 | 531 | 7.3 | 1.9 | 283 | 4.8 | 1.71 | 225 | 3.7 | 2.8 | 127 |
| N-(1,3-Dimethylbutyl)-N'-phenylcyclohexa-2,5-diene-1,4-diimine | 2.0 | 31.1 | 2.4 | 560 | 22.2 | 3.3 | 425 | 15.4 | 3.1 | 330 | 6.8 | 3.3 | 215 |
| N,N'-Di(1-ethyl-3-methylpentyl)cyclohexa-2,5-diene-1,4-diimine | 2.0 | 31.2 | 2.4 | 540 | 21.4 | 3.9 | 375 | 17.4 | 3.9 | 315 | 7.9 | 4.3 | 175 |
| N-Cyclohexyl-N'-phenyl-3-(benzothiazole-2'-thiyl)-p-phenylenediamine | 3.0 | 28.4 | 2.5 | 521 | 18.4 | 3.5 | 317 | 14.3 | 3.5 | 273 | 7.7 | 3.77 | 178 |

TS = Tensile strength (MN.m$^{-2}$)
M100 = Modulus at 100% extension (MN.m$^{-2}$)
EB = % Elongation at break.

Table 8

| Additive | Conc$^n$ pphr | Fatigue and Abrasion Resistance | | | |
|---|---|---|---|---|---|
| | | Akron Abrasion Volume | Tension Fatigue Life ($^{Kc}$ to break) | | |
| | | loss at 15° slip angle mm$^3$/500 revs. | Extension | Cycle at frequency of 5 Hz | |
| | | | 0 – 75% | 0–100% | 0–125% |
| None | — | 47 | 145 | 75 | 45 |
| N-(1,3-Dimethylbutyl)-N'-phenylcyclohexa-2,5-diene-1,4-diimine | 1.0 | 22 | 495 | 265 | 110 |
| N,N'-Di(1-ethyl-3-methylpentyl)cyclohexa-2,5-diene-1,4-diimine | 2.0 | 24 | 345 | 200 | 50 |
| Standard PVI | 1.0 | — | — | 57 | — |

We claim:

1. A method of inhibiting the premature vulcanization of a rubber vulcanizable by heating with a sulphur vulcanizing agent and a thiazole vulcanization accelerator, which method comprises incorporating into the rubber, in addition to the sulphur vulcanizing agent and the thiazole vulcanization accelerator, a cyclohexa-2,5-diene derivative having the formula

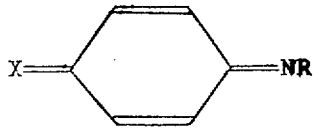

where X is O or NR' and R and R' may be the same or different and are inert alkyl, cycloalkyl or aryl groups.

2. A method as claimed in claim 1, wherein each of R and R' is an alkyl or cycloalkyl group containing from 1 to 10 carbon atoms or a monocyclic aryl group.

3. A method as claimed in claim 1, wherein the cyclohexa-2,5-diene derivative is used in an amount of from 0.1 to 10 parts by weight per 100 parts of dry rubber.

4. A method as claimed in claim 1, including the step of processing the vulcanizable rubber mix by calendering or extrusion or forming it into a desired shape prior to vulcanization.

5. A vulcanizable composition comprising a sulphur-vulcanizable rubber, a sulphur vulcanizing agent, and a thiazole vulcanization accelerator, characterised by containing, as a premature vulcanization inhibitor, a cyclohexa-2,5-diene derivative having the formula

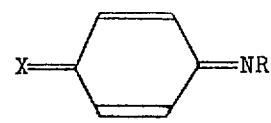

where X is O or NR' and R and R' may be the same or different and are inert alkyl, cycloalkyl or aryl groups.

6. A composition as claimed in claim 5 wherein each of R and R' is an alkyl or cycloalkyl group containing from 1 to 10 carbon atoms or a monocyclic aryl group.

7. A composition as claimed in claim 5 wherein the cyclohexa-2,5-diene derivative is used in an amount of from 0.1 to 10 parts by weight per 100 parts of dry rubber.

* * * * *